3,041,320
COPOLYMERS OF 2-HYDROXYMETHYL BUTADIENES AND 1,3-DIENES

Earl C. Chapin, Springfield, Mass., and John G. Abramo, Wilmington, Del., assignors to Monsanto Chemical Company, St. Louis, Mo., a corporation of Delaware
No Drawing. Filed May 1, 1961, Ser. No. 106,516
8 Claims. (Cl. 260—82.1)

This invention relates to novel elastomeric compounds and more particularly to novel elastomeric copolymers of 1,3-dienes and 2-hydroxymethyl butadienes.

Copolymers of styrene and butadiene per se are widely used as synthetic elastomeric compositions in applications such as automobile tires, rubber based paints, rug and fabric backings, footwear, etc. Despite their broad application and use, these copolymers are nevertheless deficient, in that they are attacked by hydrocarbons and exhibit poor adhesion to metal, glass, wood, fibrous, etc. surfaces. In one particular application, to wit: rug backings, it has been found that when styrene-butadiene copolymers are used, separation of the fibers from the backing takes place, particularly at the edges, when the rugs are subjected to ordinary use. Again, in tire applications, it has been found that the constant tire pounding which is associated with present day high speeds and irregular road surfaces, cause a high incidence of separation of the tire cords from the elastomeric casing, contributing premature tire failure, excessive wear and blowouts, etc. and ultimately presenting a threat to public safety. In addition, in surface coating applications, styrene-butadiene copolymers suffer because of their incompatibility with other surface coating resins, e.g., urea and melamine-formaldehyde condensates, alkyd resins, etc., consequently, limiting their full development as surface coatings.

Accordingly, it is a principal object of this invention to provide novel copolymers which are elastomeric in nature.

Another object of this invention is to provide novel elastomeric copolymers exhibiting excellent adhesion to metal, wood, glass, fibrous, etc., surfaces.

A further object of this invention is to provide novel elastomeric copolymers which are compatible with other resinous compositions such as urea and melamine-formaldehyde condensates, alkyd resins, etc.

A further object of this invention is to provide novel elastomeric copolymers having hydroxyl radical cross-linking sites, which facilitate cross-linking with other resinous compounds such as urea and melamine-formaldehyde condensates, alkyd resins, etc., as well as difunctional compounds such as diisocyanates, dibasic acids, anhydrides and diacid chlorides.

These and other objects are attained in a copolymer constituted of (a) from 2 to 98% by weight of a conjugated 1,3-diene selected from the class consisting of butadiene, chloroprene and isoprene with (b) from 98 to 2% by weight of 2-hydroxymethyl butadiene having the structure:

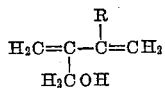

wherein R is selected from the class consisting of hydrogen, chlorine, fluorine, and methyl radicals.

The following examples are given in illustration of the invention and are not intended as limitations thereof. Where parts are mentioned, they are parts by weight unless otherwise described.

Example I

A solution of 250 g. of water, 2 g. sodium laurate, 0.2 g. potassium persulfate and 0.1 g. sodium formaldehyde sulfoxylate is charged to a one liter stirred autoclave. A solution of 75 g. butadiene, 25 g. 2-hydroxymethyl butadiene and 0.1 ml. of tertiary-dodecyl mercaptan is then charged to the autoclave under nitrogen. The reaction mixture is heated with stirring under autogenous pressure at 80° C. for 12 hours. At the end of this time, the reaction is cooled and the autoclave opened. The product obtained is a latex containing about 28% solids. Polymer recovered from this latex by precipitation from methanol is a colorless elastomeric product containing about 5.0% hydroxyl content by weight, corresponding to a copolymer composition of 75% butadiene and 25% 2-hydroxymethyl butadiene.

A nonwoven cotton fiber mat is padded with latex product to give a solids pick up of 17%. On air drying at 100° C. for 20 minutes, the treated mat is found to be strongly bound, retains its original hand and exhibits excellent wet and dry strength. The strength properties are found to be essentially unaffected by immersing a test sample of the bound fabric in solvents such as alcohols, aliphatic hydrocarbons, esters and dilute mineral acids.

Example II

A solution of 300 g. of water, 5 g. of sodium laurate, 0.4 g. potassium persulfate and 0.29 g. sodium formaldehyde sulfoxylate is charged to a one liter stirred autoclave. Then, 20 g. of chloroprene, 80 g. of 2-hydroxymethyl butadiene and 0.3 ml. of tertiarydodecyl mercaptan are added, the autoclave sealed, flushed with nitrogen and heated to 100° C. for 16 hours. The resulting latex is precipitated by the addition of 200 ml. of a 10% sodium chloride solution and the elastomeric product obtained is dried at 80° C. for 12 hours in a nitrogen atmosphere. Seventy grams of a rubbery compound are obtained which contain 15.8% hydroxyl content by weight. This corresponds to a polymer composition of 78.2% 2-hydroxymethyl butadiene and 21.8% chloroprene. The uncured polymer is soluble in methanol, ethanol and xylene-butanol mixtures.

Ten grams of the rubber product is milled with 1 g. of a solution containing 60% of a partially butylated hexamethylol melamine in 40% xylene-butanol solvent until the xylene-butanol solvent has been substantially evaporated. The resulting product is then molded at 150° C. for 20 minutes to give a clear, colorless elastomeric molding which is essentially unaffected after immersion in hexane or 1 to 1 hexane-benzene mixtures.

Example III

One hundred grams of isoprene, 100 g. of 2-hydroxymethyl butadiene, 100 g. of toluene, 2 g. of tertiarybutyl peroxide and 0.5 g. tertiarydodecyl mercaptan were heated in a pressure autoclave under an inert atmosphere at 120° C. for 40 hours. The viscous polymeric solution obtained is precipitated by pouring the same into 1000 ml. of hexane. One hundred thirty-two grams of a soft elastic product is obtained which contains about 10.2% hydroxyl content.

A solution of this polymer (20 g. in 20 g. of a 1:1 xylene-butanol mixture) is cast as a three mil film on a steel plate. The film is cured by heating in a circulating air oven at 150° C. for 20 minutes. The film is extremely tough and adhesive to the plate, and is no longer affected by contact with the xylene-butanol mixture.

Example IV

The process of Example I is again repeated with the execption that 25 g. of 2-hydroxymethyl 3-chlorobutadiene is used in place of the 2-hydroxymethyl butadiene used in that example. The product obtained is essentially the same in appearance and physical properties as the product previously obtained, but exhibits added solvent resistance.

Example V

The process of Example I is repeated again using 25 g. of 2-hydroxymethyl 3-fluorobutadiene in place of the 2-hydroxymethyl butadiene used there. This copolymer product has substantially the same appearance and physical properties as those of the product obtained in Example I.

Example VI

The process of Example I is repeated with the exception that 25 g. of 2-hydroxymethyl 3-methylbutadiene is used in place of the same amount of 2-hydroxymethyl butadiene used there. The copolymer product obtained this instant has substantially the same appearance and exhibits substantially the same properties as those of the product obtained in Example I.

The copolymer compositions of the present invention constitute, in polymerized form, a 2-hydroxymethyl butadiene having the structural formula:

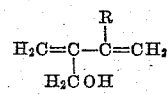

wherein R is a radical selected from the class consisting of hydrogen, chlorine, fluorine and methyl radicals copolymerized with a conjugated 1,3-diene having the structural formula:

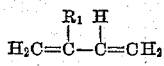

wherein $R_1$ is selected from the class consisting of hydrogen, chlorine and methyl radicals.

The featured copolymers can range in composition from 2–98% by weight of the 2-hydroxymethyl butadiene and 98–2% by weight of the 1,3-diene, with the preference being directed to 20–70% by weight of the 2-hydroxymethyl butadiene and correspondingly, 80–30% by weight of the 1,3-diene. Of the 2-hydroxymethyl butadienes, the prototype 2-hydroxymethyl butadiene is preferred. The preferred 1,3-diene is the prototype butadiene.

The copolymers presently featured can enjoy a broad range of molecular weights. These will be determined by the particular use to which the copolymer is designed for. In situations where the contemplated use is that of a surface coating, copolymers having molecular weights as low as those ranging 3,000–10,000 are intended and can be attained. By contrast, when the use is that of moldings, castings, etc., the featured copolymers should exhibit molecular weights ranging about 300,000 to 1,500,000. Other use situations will dictate other molecular weight ranges for the copolymers of the present invention. The molecular weights referred to are number average molecular weights.

As indicated above, the 2-hydroxymethyl butadiene employed as monomers in providing the copolymers in this invention, correspond to the structural formula:

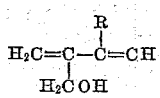

wherein R is a radical selected from the class consisting of hydrogen, chlorine, fluorine, and methyl radicals. The specific examples of the 2-hydroxymethyl butadiene include 2-hydroxymethyl butadiene; 2-hydroxymethyl 3-chlorobutadiene; 2-hydroxymethyl 3-fluorobutadiene; 2-hydroxymethyl 3-methylbutadiene, etc. The 2-hydroxymethyl butadiene starting materials can be prepared by the method disclosed in the thesis of Matthew Edward Hermes entitled, "The Synthesis of Bifunctional Dienes From 2-Hydroxymethyl-1,3-Butadiene and Their Use in Diels-Alder Polymerizations" (University of Maryland, Ph.D., 1959), a reprint of which can be obtained from University Microfilms, Inc., Ann Arbor, Michigan.

The conjugated 1,3-diene monomers employed as monomers in producing the copolymers of this invention correspond to the structural formula:

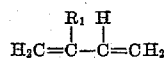

wherein $R_1$ is selected from the class consisting of hydrogen, chlorine, and methyl radicals. Specifically, these include butadiene, chloroprene and isoprene and mixtures of the same.

The novel elastomeric copolymers of this invention can be prepared using mass, solution or emulsion polymerization techniques. In the mass and solution copolymerization processes, a monomeric mixture of from 2 to 98% by weight of the conjugated 1,3-diene and from 98 to 2% by weight of the 2-hydroxymethyl butadiene, on the weight of total monomers, is heated at about 50–150° C. under autogenous pressures. Solvent suitable for use in the solution process include organic liquids which are inert to the reaction, e.g., toluene, xylene, dioxane, ethanol or ethanol-toluene mixtures.

In the proposed emulsion copolymerization process, a monomeric mixture of a conjugated 1,3-diene and a 2-hydroxymethyl butadiene corresponding in monomer amounts designed to eventuate in the copolymer product is continuously and slowly added to an excess of water containing an emulsifier, initiator, and maintained at the polymerization temperature of from 50 to 100. The amount of water to be used can be varied over a wide range. However, it is generally preferable to use from 100–300 parts of water per 100 parts of monomer mixture in order to obtain a product in latex form containing from 25–50% by weight solids.

In the emulsion process, a wide variety of emulsifying agents can be used, alone or in admixture, such as salts of high molecular weight fatty acids, amino soaps, alkali metal salts of resin acids, alkali metal salts of long-chain alkyl sulfates and sulfonates, ethylene oxide condensates of long-chain fatty acids, alcohols or mercaptans, sodium salts of sulfonated hydrocarbons, aralkyl sulfonate, etc. Examples of representative emulsifiers include sodium oleate, triethanolamine, sodium lauryl sulfate, salts of sulfosuccinic acid esters, the 2-ethylhexyl ester of sulfosuccinic acid esters, the 2-ethylhexyl ester of sulfosuccinic acid, sodium salts of dioctyl sulfosuccinic acids, sodium salts of sulfated cetyl alcohol, nonyl phenol adducts of polyethylene oxides, etc. Generally, from about 0.1–5 parts by weight of emulsifier will be used per 100 parts of total monomers. However, somewhat greater or lesser amounts may be used if desired.

Polymerization initiators suitable for use in the emulsion process include free radical polymerization initiators such as potassium persulfate, ammonium persulfate, cumene hydroperoxide, redox recipes, etc. Examples of redox recipes which can be used include hydrogen peroxide, potassium persulfate, cumene hydroperoxide, tertiarybutylisopropylbenzene hydroperoxide, diisopropylbenzene hydroperoxide, etc., as the oxidative portion and ferrous sulfate potassium ferricyanide, dihydroxyacetone, sodium formaldehyde sulfoxylate, triethanolamine, glucose, fructose, etc., as the reductive portion. Other known emulsion polymerization catalysts may also be used herein. The amount of such initiator employed will generally fall within the range of from about 0.05–5 parts by weight per 100 parts by weight of total monomers. Somewhat greater or lesser amounts of initiator can be used if desired.

The copolymers of this invention are clear and nearly colorless elastomers ranging from thin aqueous latices to solid elastomeric or rubbery solids, in their compositions, depending upon their molecular weights, and reflective of the type of polymerization process by which they are made and the extent to which the polymerization process is carried out. The featured copolymers exhibit excellent adhesion to natural and synthetic fibers such as cotton, rayon, nylon, etc., as well as wood, metal and other surfaces. They are also compatible with other resinous materials such as melamine and urea-formaldehyde condensates, alkyd resins, etc., as well as difunctional compounds such as the diisocyanates, dibasic acids and their corresponding anhydrides and dibasic chlorides, etc. The featured copolymers can be compounded with these resinous resins and subsequently exposed to elevated temperature to produce modified or cross-linked elastomeric materials exhibiting solvent resistance and structural stability. Whether modified or not, the copolymers of this invention are useful in the production of automobile tires, rubber emulsion products, footwear and various adhesives.

The elastomeric copolymers of this invention can also be copolymerized in ternary or quaternary systems, for example, by the addition of acrylonitrile, styrene, or admixtures of both to the reaction of 2-hydroxymethyl butadiene and 1,3-diene, etc.

Further, the elastomeric copolymers of this invention whether compounded with other resinous materials or cross-linking agents or not, can be modified by the incorporation of conventional additives such as pigments, lubricants, fillers, stabilizers, plasticizers, etc.

It is obvious that many variations may be made in the products and processes set forth above without departing from the spirit and scope of this invention.

What is claimed is:

1. A copolymer of (a) from 2 to 98% by weight of a 2-hydroxymethyl butadiene having the structural formula:

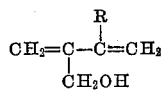

wherein R is a radical selected from the class consisting of hydrogen, chlorine, fluorine and methyl radicals with (b) 98–2% by weight of a conjugated 1,3-diene corresponding to the general formula:

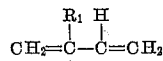

wherein $R_1$ is selected from the class consisting of hydrogen, chlorine, and methyl radicals.

2. The copolymer according to claim 1 wherein R is hydrogen.
3. The copolymer according to claim 1 wherein R is chlorine.
4. The copolymer according to claim 1 wherein R is fluorine.
5. The copolymer according to claim 1 wherein R is a methyl radical.
6. The copolymer according to claim 1 wherein $R_1$ is hydrogen.
7. The copolymer according to claim 1 wherein $R_1$ is chlorine.
8. The copolymer according to claim 1 wherein $R_1$ is a methyl radical.

No references cited.